United States Patent
Kobayashi et al.

(10) Patent No.: US 6,934,962 B2
(45) Date of Patent: Aug. 23, 2005

(54) DISC CARTRIDGE WITH MOUNTING PART OF SHUTTER SLIDE PORTION ARRANGED ON STAGE OF ANOTHER SHUTTER SLIDE PORTION

(75) Inventors: Daiki Kobayashi, Miyagi (JP); Hideyo Ishikawa, Kanagawa (JP); Hiroshige Takakuwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 10/296,800

(22) PCT Filed: Mar. 28, 2002

(86) PCT No.: PCT/JP02/03029
§ 371 (c)(1),
(2), (4) Date: Nov. 26, 2002

(87) PCT Pub. No.: WO02/080175
PCT Pub. Date: Oct. 10, 2002

(65) Prior Publication Data
US 2003/0142442 A1 Jul. 31, 2003

(30) Foreign Application Priority Data

| Mar. 29, 2001 | (JP) | 2001-94681 |
| May 11, 2001 | (JP) | 2001-140979 |
| May 11, 2001 | (JP) | 2001-140981 |

(51) Int. Cl.$^7$ .............................................. G11B 23/03
(52) U.S. Cl. ...................... 720/738; 360/133; 369/291.1
(58) Field of Search .......................... 360/133; 369/291, 369/291.1; 720/738, 743

(56) References Cited

U.S. PATENT DOCUMENTS 6,687,215 B1 * 2/2004 Bagnell et al. ............. 369/291
2001/0030833 A1 * 10/2001 Bagnell et al. ............. 360/133

FOREIGN PATENT DOCUMENTS

| JP | 59-157879 | 9/1984 | |
| JP | 04034784 A | * 2/1992 | ........... G11B/23/03 |
| JP | 5-342795 | 12/1993 | |
| JP | 06084315 A | * 3/1994 | ........... G11B/23/03 |
| JP | 2002324376 A | * 11/2002 | ........... G11B/23/03 |

* cited by examiner

Primary Examiner—Craig A. Renner
(74) Attorney, Agent, or Firm—Frommer Lawrence & Haug LLP; William S. Frommer; Thomas F. Presson

(57) ABSTRACT

An information recording medium cartridge with a disc, a cartridge casing having the disc accommodated therein, and a shutter slidably mounted to the cartridge casing. The shutter has a first shutter plate for opening and closing a recording and/or reproducing opening of the cartridge casing and a second shutter plate for opening and closing the recording and/or reproducing opening on another side. The first and second shutter plates are independently movable between first and second positions for closing and opening the recording and/or reproducing openings.

10 Claims, 19 Drawing Sheets

DISC CARTRIDGE WITH MOUNTING PART OF SHUTTER SLIDE PORTION ARRANGED ON STAGE OF ANOTHER SHUTTER SLIDE PORTION

TECHNICAL FIELD

The present invention relates to an information recording medium cartridge which stores an information recording medium such as magnetic disc, optical disc, magneto-optical disc, phase-change type optical disc or the like.

BACKGROUND ART

It is known an information recording medium cartridge as shown, for example, in FIG. 24.

The information recording medium cartridge (refer hereafter to as "cartridge" simply) 101 is provided with an information recording medium (refer hereafter to as "disc") 102, such as optical disc, magneto-optical disc or the like, having recording layers arranged on right and reverse sides, a cartridge casing (refer hereafter to as "shell") 103 which rotatably stores the disc 102, and a shutter 105 slidably mounted to the shell 103 for opening and closing recording and/or reproducing openings (refer hereafter to as "openings" simply) arranged in right and reverse sides of the shell 103.

The shutter 105 is provided with a first shutter plate 106 which opens and closes an opening 104 on the right side of the shell 103 and a second shutter plate 107 which opens and closes the opening 104 on the reverse side of the shell 103. The shutter 105 is formed roughly like an U shape by bending a metal plate to simultaneously open and close the openings 104 on the right and reverse sides of the shell 103.

When loading the cartridge 101 into a recording and/or reproducing device (refer hereafter to as "drive unit"), the shutter 105 is driven and operated by a shutter operating member mounted to the drive unit to simultaneously open the openings 104 on the right and reverse sides of the shell 103.

With the cartridge 101, as shown in FIG. 25, the disc 102 is chucked on a turntable 301 of the drive unit through the opening 104 on the reverse side of the shell 103 for rotation and driving, and recording and/or reproducing of the disc 102 is carried out by an optical pickup 302 through the opening 104 on the reverse side.

With the conventional disc 101 using the shutter 105 having first and second shutter plates 106, 107 integrally formed, when opening the opening 104 on the reverse side of the shell 103 for recording and/or reproducing, the opening 104 on the reverse side of the shell 103 is also opened even when there is no direct relation directly with recording and/or reproducing, raising an inconvenience that dust 303 or the like entering the shell 103 through the opening 104 on the right side adheres and deposits on the top surface of the disc 102. Adhesion of the dust or the like has a considerable adverse influence on a high-density large-capacity disc.

In order to solve the above inconvenience, a cartridge 201 using a divided shutter as shown in FIGS. 26 and 27 has been developed. In the cartridge 201, a shutter 205 comprises a first shutter plate 206 which opens and closes an opening 204 on the right side of a shell 203 and a second shutter plate 207 which opens and closes an opening 204 on the reverse side of the shell 203. The first and second shutter plates 206, 207 are moved individually to open and close the openings 204 independently.

The first and second shutter plates 206, 207 are provided with a closing portion 208 which closes the opening 204 and an open portion (recessed window) 209 continuously arranged with one side of the closing portion 208 to open the opening 204.

As shown in FIG. 26, when the first and second shutter plates 206, 207 are in a first position, the closing portions 208 of the first and second shutter plates 206, 207 are in the overlapped state to close the openings 204 arranged in right and reverse sides of the shell 203. And when being moved to a second position as shown in FIG. 27, the open portion (recessed window) 209 and the openings 204 are overlapped one another, opening the openings 204.

As shown in FIG. 28, the first and second shutter plates 206, 207 are mounted to a slide member 210. The slide member 210 is divided into a first slide portion 211 to which the first shutter plate 206 is mounted and a second slide portion 212 to which the second shutter plate 207 is mounted.

When loading the cartridge 201 using the divided shutter into the drive unit, only the second shutter plate 207 is driven and operated by a shutter opening member mounted to the drive unit to open only the opening 204 on the reverse side of the shell 203. And as shown in FIG. 29, through the opening 204 on the reverse side of the shell 203, the disc 202 is chucked on the turntable 301 of the drive unit for rotation and driving, and recording and/or reproducing of the disc 202 is carried out by the optical pickup 302. On the other hand, the first shutter plate 206 closes the opening 204 on the right side of the shell 203 to prevent an intrusion of dust 303 or the like into the shell 203 through the opening 204.

The conventional cartridge 201 using divided shutter raised the following problems:

(1) As shown in FIG. 26, since the first and second shutter plates 206, 207 are provided with closing portion 208 which closes the opening 204 and open portion (recessed window) 209 which opens the opening 204, a width $W_1$ in the moving direction becomes large (the width $W_1$ of the first and second shutter plates 206, 207 is equal to a value obtained by adding a width $W_2$ of the closing portion 208 to a width $W_3$ of the open portion 209). Therefore, the first and second shutter plates 206, 207 become larger and heavier by that amount. Moreover, the cost of the first and second shutter plates 206, 207 becomes higher.

(2) In order to put the closing condition of the opening 204 of the shell 203 as shown in FIG. 26 to the opening condition of the opening 204 as shown in FIG. 27, the first and second shutter plates 206, 207 should be moved by roughly the same width $W_4$ as the width $W_2$ of the closing portion 208. Therefore, a width $W_5$ of a moving area of the first and second shutter plates 206, 207 for opening and closing the openings 204 is equal to a value obtained by adding the width $W_1$ of the first and second shutter plates 206, 207 to the moving width $W_4$, which is a value roughly equal to a width $W_6$ of the shell 203, thus leading to difficult arrangement of a label adhesion area for an index card or the like.

(3) The first and second slide portions 211, 212 are formed by simply vertically dividing into two parts the slide member 210 in the moving direction, so that, as shown in FIG. 30, for example, the first and second slide portions 211, 212 are inclined to separate the first and second shutter plates 206, 207 from the right and reverse sides 203a, 203b of the shell 203, producing a clearance G between the first and second shutter plates 206, 207 and the right and reverse sides 203a, 203b of the shell 203, thus becoming a cause of intrusion of dust.

An object of the present invention is to allow arrangement of a label adhesion area for an index card or the like on one side portion of the openings of the cartridge casing by reducing the width of the first and second shutter plates in the moving direction. Further, it is to achieve a reduction in the weight and cost of the first and second shutter plates.

Another object of the present invention is to facilitate handling of the first and second slide members and its assembling to the cartridge casing by integrally coupling them by a spring member.

Still another object of the present invention is to prevent the first and second shutter plates from being separated from the right and reverse sides of the cartridge casing by inclination of the first and second slide portions.

DISCLOSURE OF THE INVENTION

The invention in claim 1 provides an information recording medium cartridge provide with a disc-like information recording medium, a cartridge casing having the information recording medium accommodated therein, a shutter slidably mounted to the cartridge casing and for opening and closing recording and/or reproducing openings arranged in right and reverse sides of the cartridge casing, and a slide member for movably mounting the shutter to the cartridge casing in a direction to open and close the openings, wherein the shutter is provided with a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the first and second shutter plates are independently moved between a first position for closing the recording and/or reproducing openings arranged in the right and reverse sides of the cartridge casing and a second position for opening the recording and/or reproducing openings, wherein the first and second shutter plates are of a size enough large to close the recording and/or reproducing openings arranged in the right and reverse sides of the cartridge casing and substantially the same width as that of the openings, and wherein in the first position for closing the recording and/or reproducing openings, the first and second shutter plates are formed to overlap one another in a vertical direction of the cartridge casing, by which the first and second shutter plates can be reduced in width and thus in size and weight as compared with the conventional cartridge wherein in the first position for closing the openings arranged in the right and reverse sides of the cartridge casing, only part of the first and second shutter plates overlap one another.

The information recording medium cartridge in claim 2 is such that in the information recording medium cartridge in claim 1, the cartridge casing has at one side of the openings a shutter slide area and at another side thereof a label adhesion area, so that a sheet or a card indicating the recording contents and the like of a disc can be placed on the label adhesion area arranged at one side of the openings to clearly indicate the disc recording contents and the like.

The information recording medium cartridge in claim 3 is such that in the information recording medium cartridge in claim 1, the second positions of the cartridge casing on the right and reverse sides are arranged in a position symmetrical about the first position to allow reverse loading to a recording and reproducing device, so that when the information recording medium cartridge is used upside down, the moving direction of the shutter plate is the same as that when used normally (not upside down). Therefore, the first and second shutter plates can easily be moved from the first position to the second position by a single shutter opening member provided to the drive unit.

The information recording medium cartridge in claim 4 is such that in the information recording medium cartridge in claim 1, the slide member is divided into a first slide portion to which the first shutter plate is mounted and a second slide portion to which the second shutter plate is mounted, and the first and second slide portions comprise a shutter-plate mounting portion to which any one of the first and second shutter plates, a stage formed with a bottom of the shutter-plate mounting portion at one side and having substantially the same width as that of the shutter-plate mounting portion and substantially half a length thereof and on which the shutter mounting portion of another slide member is disposed, a shutter-opening-member engagement arranged on an upper face of the shutter-plate mounting portion at an end in a slide direction and with which a shutter opening member of a drive unit is engaged, a pair of assembling legs to the cartridge casing and arranged on a lower face of the shutter-plate mounting portion in a center portion at the end in the slide direction, and a pair of assembling legs to a shell and arranged on a lower face of the shutter-opening-member engagement, by which part of the shutter-plate mounting portion of one of the first and second slide portions is supported in the state placed on the stage of another slide portion, thus preventing the first and second slide portions from separating from the right and reverse sides of the cartridge casing due to inclination of the first and second slide portions The information recording medium cartridge in claim 5 is such that in the information recording medium cartridge in claim 4, the first and second slide portions are provided with a spring catch to which one and another ends of a spring member are caught, and a front end of the shutter-plate mounting portion of one of the first and second slide portions is engaged with the shutter-opening-member engagement of another slide portion, by which the first and second slide members is in the state integrally coupled by the spring member, facilitating handling and assembling to the shell.

The information recording medium cartridge in claim 6 is such that in the information recording medium cartridge in claim 4, positioning concave and convex fitted to each other are provided to a contact face of the front end of the shutter-plate mounting portion and the shutter-opening-member engagement, so that the fitting of the concave and convex provided to the contact face of the front end of the shutter-plate mounting portion of one slide member and the shutter-opening-member engagement of another slide member allows prevention of the first and second slide members from separating from each other.

The information recording medium cartridge in claim 7 is such that in the information recording medium cartridge in claim 4, the spring catch is arranged between and inside the pair of assembling legs, so that when one and another ends of the spring member is caught to the spring catches of the first and second slide members, the spring member can be placed within the lower face of the slide member.

The information recording medium cartridge in claim 8 is such that in the information recording medium cartridge in claim 4, the first and second slide portions are formed having the same shape and size, so that the first and second slide portions can be used without distinction, leading to a reduction in the number of parts.

The information recording medium cartridge in claim 9 is such that in the information recording medium cartridge in claim 1, the first and second slide portions are provided with a shutter-plate mounting portion formed by dividing the slide member in a moving direction and a stage protrusively formed at one side of the shutter-plate mounting portion by diving the slide member in a thickness direction and having substantially half a length of the shutter-plate mounting portion in the moving direction, and part of the shutter-plate mounting portion of one of the first and second slide portions is supported in a state placed on the stage of another slide portion, so that the first and second slide portions can be prevented from being inclined to each other, thus preventing the first and second shutter plates from separating from the right and reverse sides of the shell.

The information recording medium cartridge in claim 10 is such that in the information recording medium cartridge in claim 9, the stage is formed with a lower portion of the shutter-plate mounting portion at one side and having substantially the same width as that of the shutter-plate mounting portion, so that existence of the stage allows prevention of the width of the slide portion from increasing. Moreover, the shutter-plate mounting portion can be prevented from falling from the stage, leading to stable sliding of the shutter-plate mounting portion.

The information recording medium cartridge in claim 11 is such that in the information recording medium cartridge in claim 9, the first and second slide portions are formed having the same shape and size, so that the two can be used without distinction, leading to a reduction in the number of parts.

BEST MODE FOR CARRYING OUT THE INVENTION

Next, an explanation is made about an information recording medium cartridge of the present invention under the headings of 1) general constitution of the whole, 2) constitution of disc, 3) constitution of shell, 4) constitution of shutter, 5) constitution of slide member, 6) another embodiment, and 7) operation.

1) General Constitution of the Whole Information Recording Medium Cartridge

Figure 1:
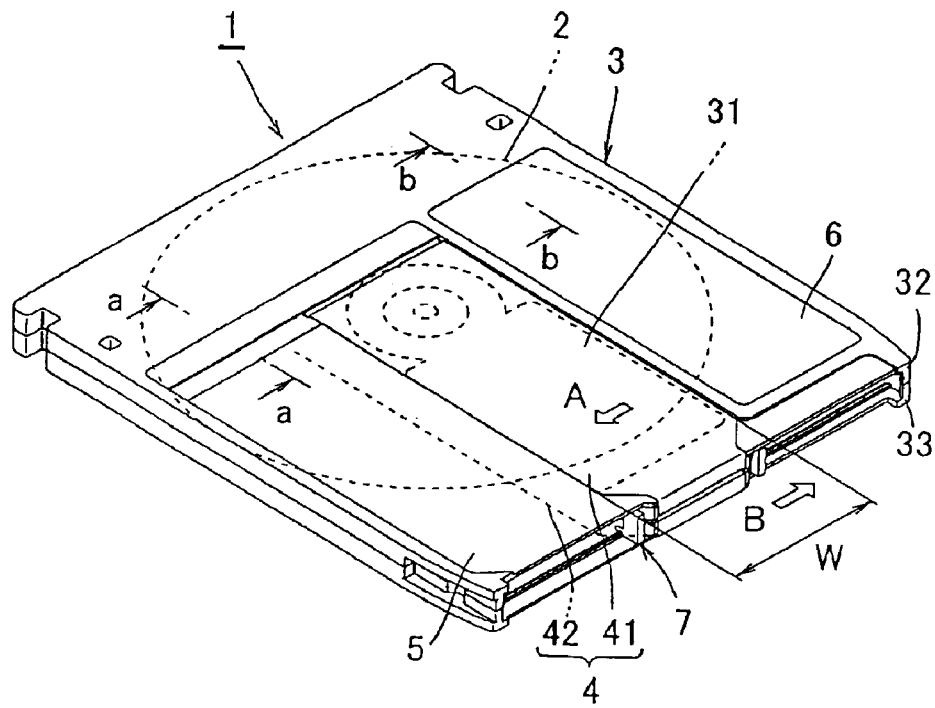
FIG. 1 is a perspective view of a cartridge seen from the right side (shutter closed condition)
Figure 2:
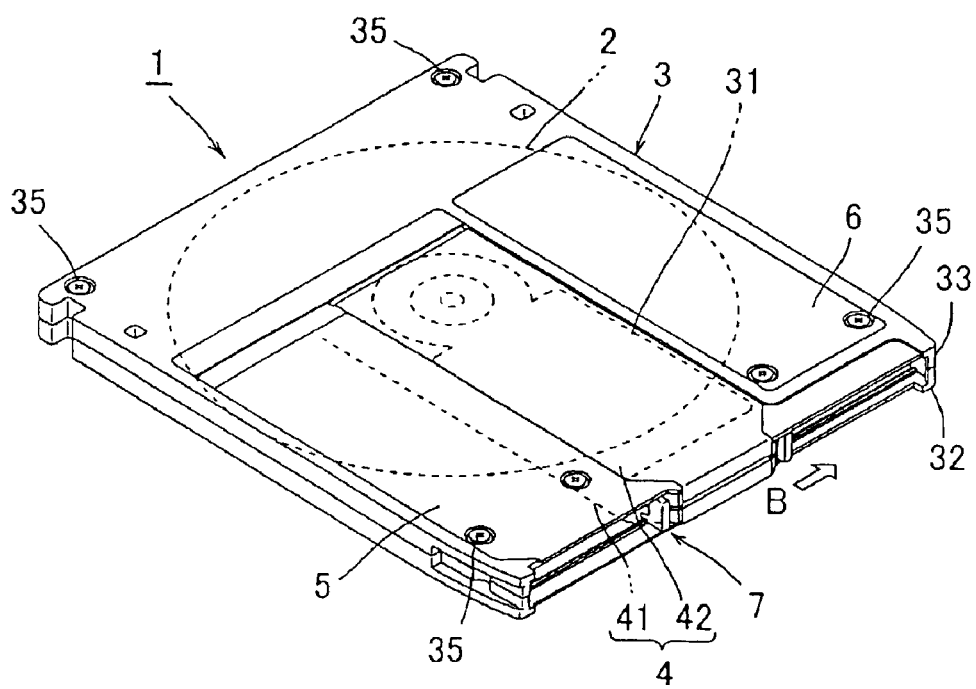
FIG. 2 is a perspective view of the cartridge seen from the reverse side (shutter closed condition)
Figure 3:
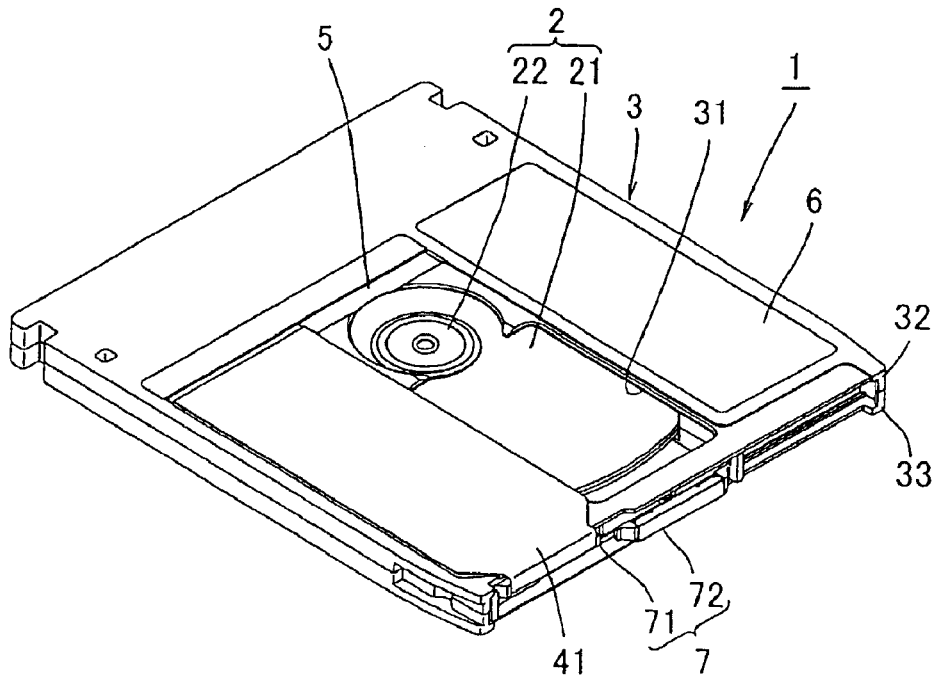
FIG. 3 is a perspective view of the cartridge seen from the right side (shutter open condition)
Figure 4:
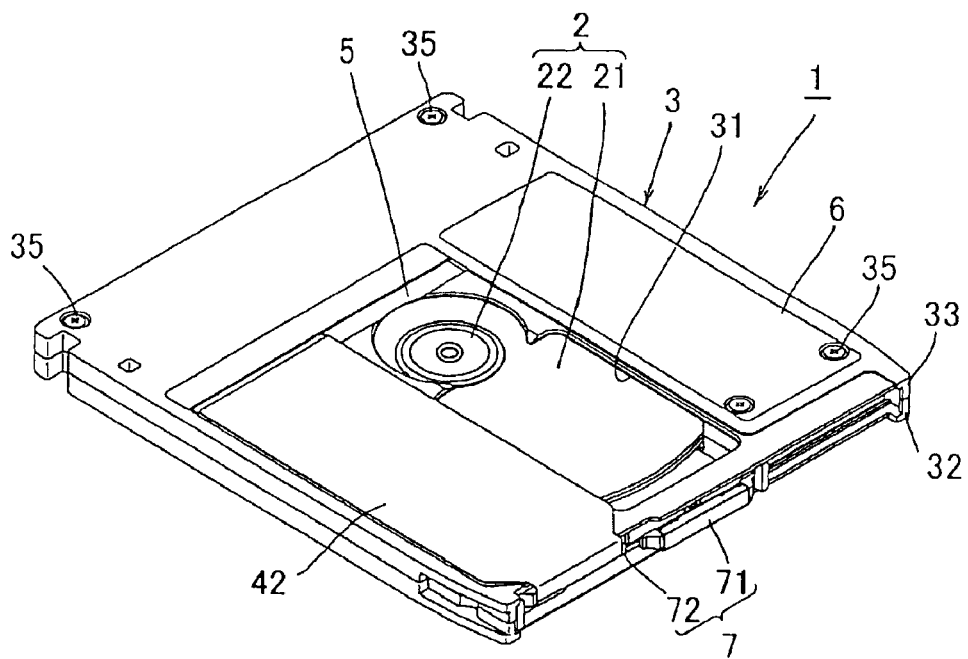
FIG. 4 is a perspective view of the cartridge seen from the reverse side (shutter open condition)

FIG. 1 is a perspective view of the information recording medium cartridge (refer hereafter to as "cartridge") in the so-called shutter closed condition, seen from the right side, FIG. 2 is a perspective view of the cartridge seen from the reverse side, FIG. 3 is a perspective view of the cartridge in the reverse-side shutter open condition, and FIG. 4 is a perspective view of the cartridge seen from the reverse side. The cartridge 1 is constructed as a so-called double-sided application cartridge which allows recording and/or reproducing on both of the right and reverse sides.

The cartridge 1 is provided with a disc-like information recording medium (refer hereafter to as "disc") 2, a cartridge casing (refer hereafter to as "shell") 3 which rotatably stores the disc 2, recording and/or reproducing openings (refer hereafter to as "openings") 31 arranged in the right and reverse sides of the shell 3, and a shutter 4 which opens and closes the openings 31.

The shutter 4 is provided with a first shutter plate 41 which opens and closes the opening 31 arranged in the right side (side of an upper half 32 which will be explained later) of the shell 3, and a second shutter plate 42 which opens and closes the opening 31 arranged in the reverse side (side of a lower half 33 which will be explained later) of the shell 3.

The first and second shutter plates 41, 42 are moved independently between a first position for closing the openings 31 shown in FIGS. 1 and 2 and a second position for opening the openings 31 shown in FIGS. 3 and 4, respectively.

The first and second shutter plates 41, 42 which constitute the shutter 4 are formed to have a dimension slightly larger than the openings 31 arranged in the right and reverse sides of the shell 3 and required for completely closing the openings 31, and a width (size) W so that in the first position for closing the openings 31, they substantially coincide with each other in the direction of thickness of the shell 3 to overlap one another. In the embodiment, one and the same member is used for the first and second shutter plates 41, 42.

The first shutter plate 41 is moved from the first position for closing the opening 31 to the direction of arrow A so as to move to the second position for opening the opening 31. The second shutter plate 42 is moved from the first position for closing the opening 31 to the direction of arrow B opposite to the direction of arrow A so as to move slide to the second position for opening the opening 31.

Moving areas 5 for the first and second shutter plates 41, 42 are arranged on the right and reverse sides of the shell 3 at one side portion with respect to the openings 31, and label adhesion areas 6 for an index card or the like are arranged thereon at another side portion. The first and second shutter plates 41, 42 are slidably mounted to the shell 3 by a slide member 7 which will be explained in detail later.

2) Constitution of Disc

Figure 5:
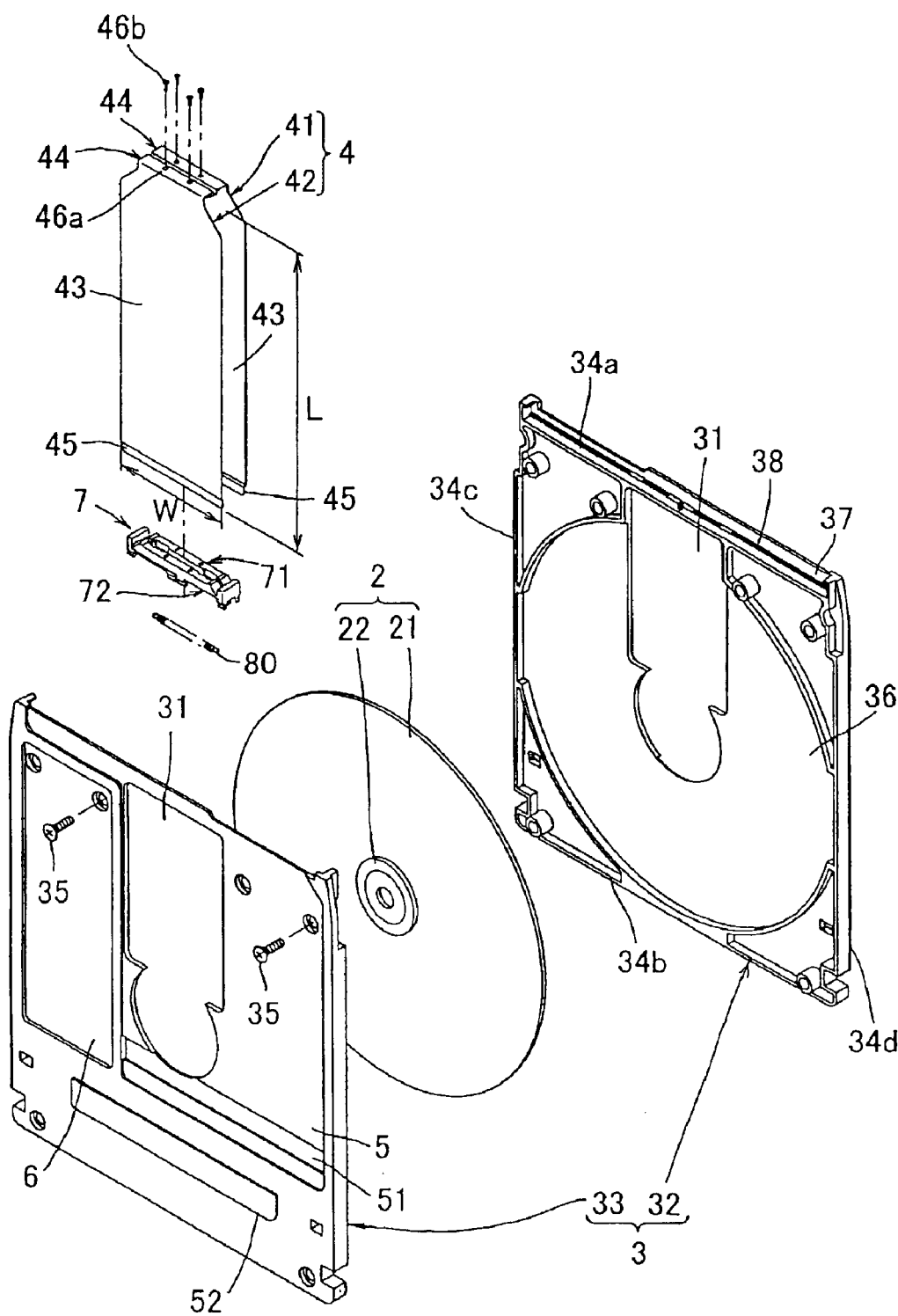
FIG. 5 is an exploded perspective view of the cartridge.

As shown in FIG. 5, the disc 2 includes a disc-like recording medium main body 21 and a center hub 22 arranged in center of the recoding medium main body 21.

Figure 6:
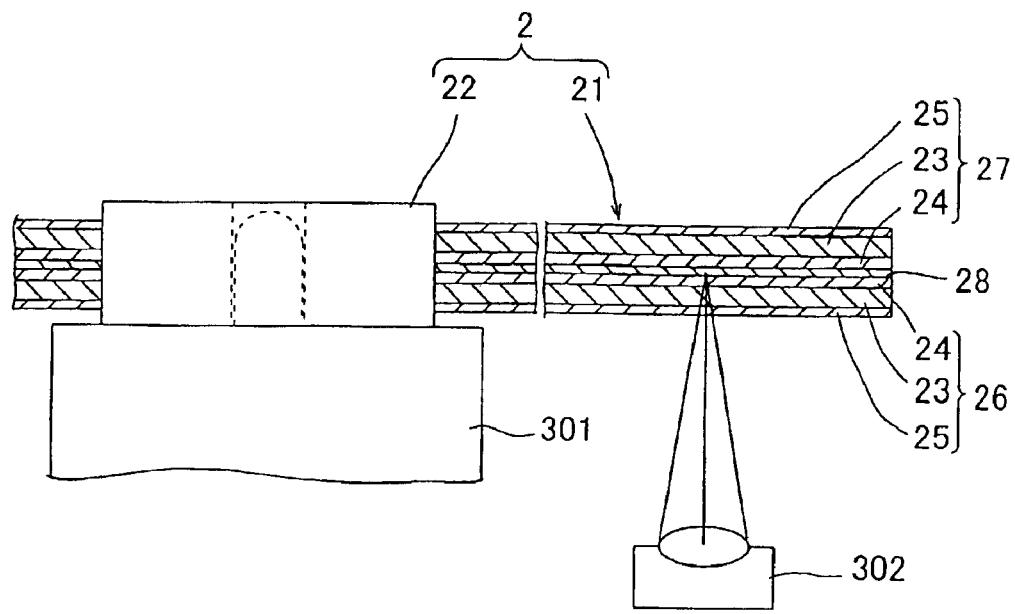
FIG. 6 is a sectional view of a disc.

As shown in FIG. 6, for example, the recording medium main body 21 is formed by arranging a recording layer 24 on the inner surface of a substrate 23 of polycarbonate (PC) and placing one upon another first and second recording media 26, 27 of film-formed substrate having a protective layer 25 on the outer surface for adhesion through an adhesive layer 28. With the disc 2, with the center hub 23 chucked on a turntable 301 of the drive unit, recording and/or reproducing of the recording layer 24 of the first recording medium 26 becomes possible by an optical pickup 302, whereas with the disc 2 turned over, recording and/or reproducing of the recording layer 24 of the second recording medium 27 becomes possible by the optical pickup 302. The recording medium main body 21 is formed with a high capacity of several GB to 40 GB (gigabyte).

As a matter of course, the center hub 22 is constructed such that not only when carrying out recording and/or reproducing of the recording layer 24 of the first recording medium 26 of the disc 2, but also when carrying out recording and/or reproducing of the recording layer 24 of the second recording medium 27 with the disc 2 turned over for loading, the disc 2 can surely be chucked on the turntable 301 of the drive unit.

3) Constitution of Shell

The shell 3 is formed by mutually butting the front, rear, left, and right peripheral walls 34a, 34b, 34c, 34d of the upper half 32 and the lower half 33 having the openings 31 in the center in the axial direction (shutter slide direction) for connection with a plurality of screws 35. The side where the head of the screws 35 is visible is the reverse side.

With the shell 3, the inside of the front and rear peripheral walls 34a, 34b of the upper and lower halves 32, 33 forms a disc storage 36, and the outside of the front peripheral walls 34a of the upper and lower halves 32, 33 forms a slide-member assembling portion 37.

And the right and reverse sides of the recording medium main body 21 of the disc 2 stored in the disc storage 36 and those of the center hub 22 face the openings 31 of the upper and lower halves 32, 33.

Figure 7:
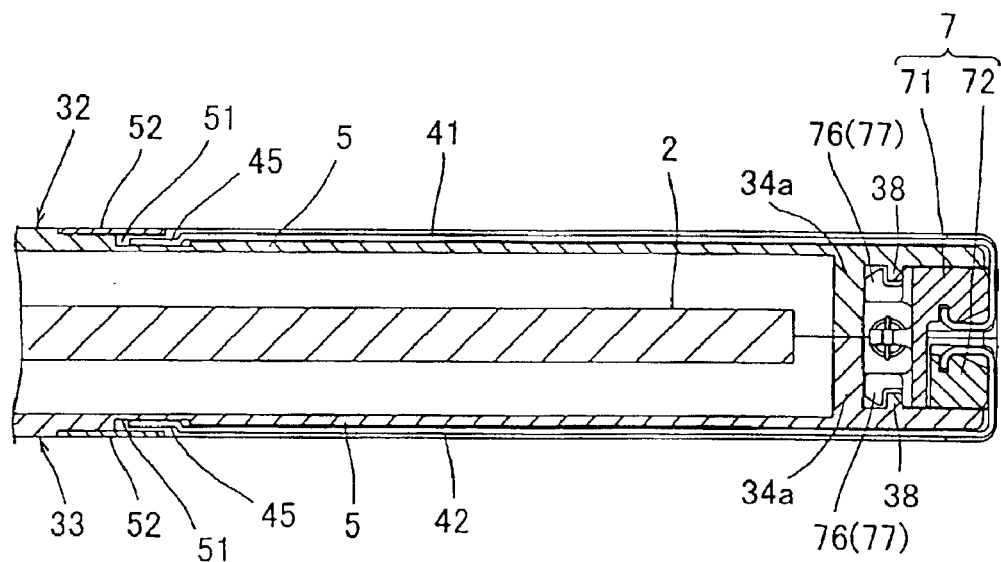
FIG. 7 is a sectional view along a—a in FIG. 1.

The upper and lower shutter slide areas 5 and the label adhesion areas 6 are arranged on the outer surface of the upper and lower halves 32, 33. The shutter slide area 5 is formed in the position lowered from the outer surface of the upper and lower halves 32, 33 roughly by the thickness of the first and second shutter plates 41, 42, wherein when placing the first and second shutter plates 41, 42 on shutter slide areas 5 of the upper and lower halves 32, 33, the outer surface of the upper and lower halves 32, 33 and that of the first and second shutter plates 41, 42 are roughly located on the same plane or slightly lowered. Further, an end of the shutter slide area 5 on the side of the rear peripheral wall 34b of the upper and lower halves 32, 33 forms a shutter-end insertion 51 which is lowered further by one step. As shown in FIG. 7, ends 45 of the first and second shutter plates 41, 42 are inserted into the shutter-end insertion 51, and are prevented from being separated (rolled up) from the outer surface of the upper and lower halves 32, 33 by a slide guide plate 52 mounted inside the shutter-end insertion 51, achieving insured smooth sliding of the first and second shutter plates 32, 33.

Figure 8:
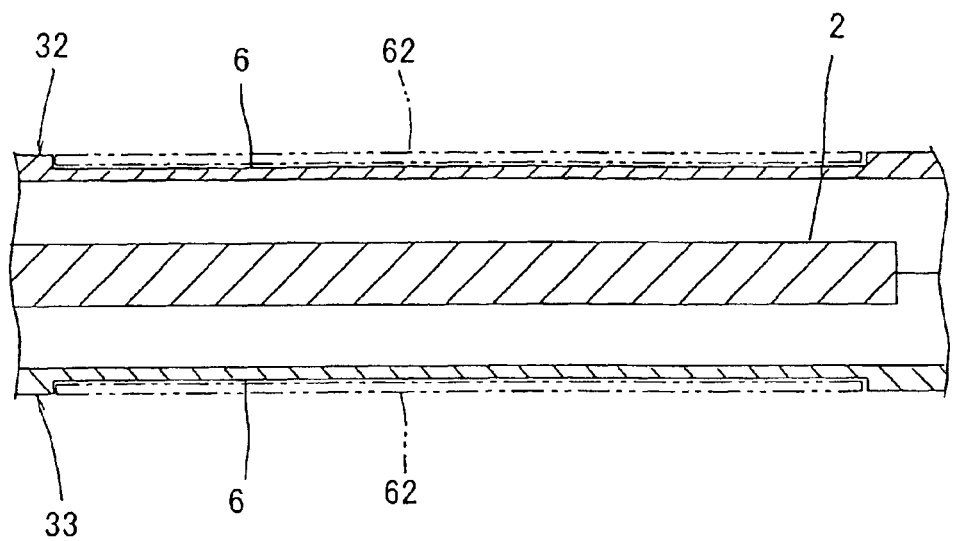
FIG. 8 is a sectional view along b—b in FIG. 1.

The label adhesion area 6 is formed in the position lowered from the outer surface of the upper and lower halves 32, 33 roughly by the thickness of an adhesive sheet, wherein when adhering a sheet 62 shown in two-dot chain line on the seat adhesion area 6 as shown in FIG. 8, the outer surface of the upper and lower halves 32, 33 and that of the sheet are roughly on the same plane or slightly lowered.

Figure 9:
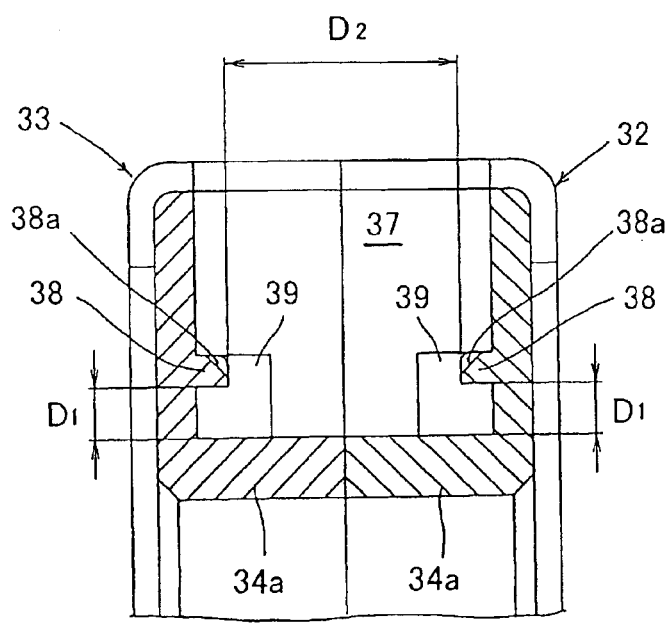
FIG. 9 is a sectional view of a front peripheral wall side of a shell.

As shown in FIG. 5, a guide projection 38 for slidably mounting the slide member 7 is arranged on the inner surface of the slide-member assembling portion 37 of the upper and lower halves 32, 33. As shown in FIG. 9, the guide projection 38 is formed outside the front peripheral wall 34a of the upper and lower halves 32, 33 and roughly in parallel thereto with a predetermined distance $D_1$ with respect to the front peripheral wall 34a. The guide projections 38 of the upper and lower halves 32, 33 face each other with a predetermined distance $D_2$ in the coupled condition of the upper and lower halves 32, 33, wherein through the distance $D_2$, an assembling leg 77 of the slide member 7, which will be explained in detail later, can be inserted in a clearance between the guide projections 38, 38 and between the guide projection 38 and the front peripheral wall 34a (refer to FIG. 7).

Arranged on the guide projection 38 of the upper and lower halves 32, 33 is a so-called chamfered inclined face 38a for facilitating insertion of the assembling leg 77 of the slide member 7. Moreover, a positioning projection 39 is arranged in the center in the longitudinal direction (slide-member moving direction) of the guide projection 38 of the upper and lower halves 32, 33 to set the guide member 6 and the shutter 4 mounted thereto in the first position for closing the openings 31.

The shell 3 is formed out of synthetic resin having excellent formability and mechanical strength, such as polycarbonate (PC), ABS resin or the like.

4) Constitution of Shutter

The shutter 4 is divided into the first shutter plate 41 which opens and closes the opening 31 of the upper half 32 and the second shutter plate 42 which opens and closes the opening 31 of the lower half 33.

The first and second shutter plates 41, 42 are provided with a shutter main body 43 formed like a rectangle with width W and length L which are slightly larger than those of the opening 31 to allow complete closing thereof, a slide-member mounting portion 44 arranged at one end of the shutter main body 43 in the longitudinal direction, and an inserted-side end 45 arranged at another end of the shutter main body 43 in the longitudinal direction and inserted into the shutter-end insertion 51 at one end of the shutter slide area 5 of the upper and lower halves 32, 33.

Figure 10:
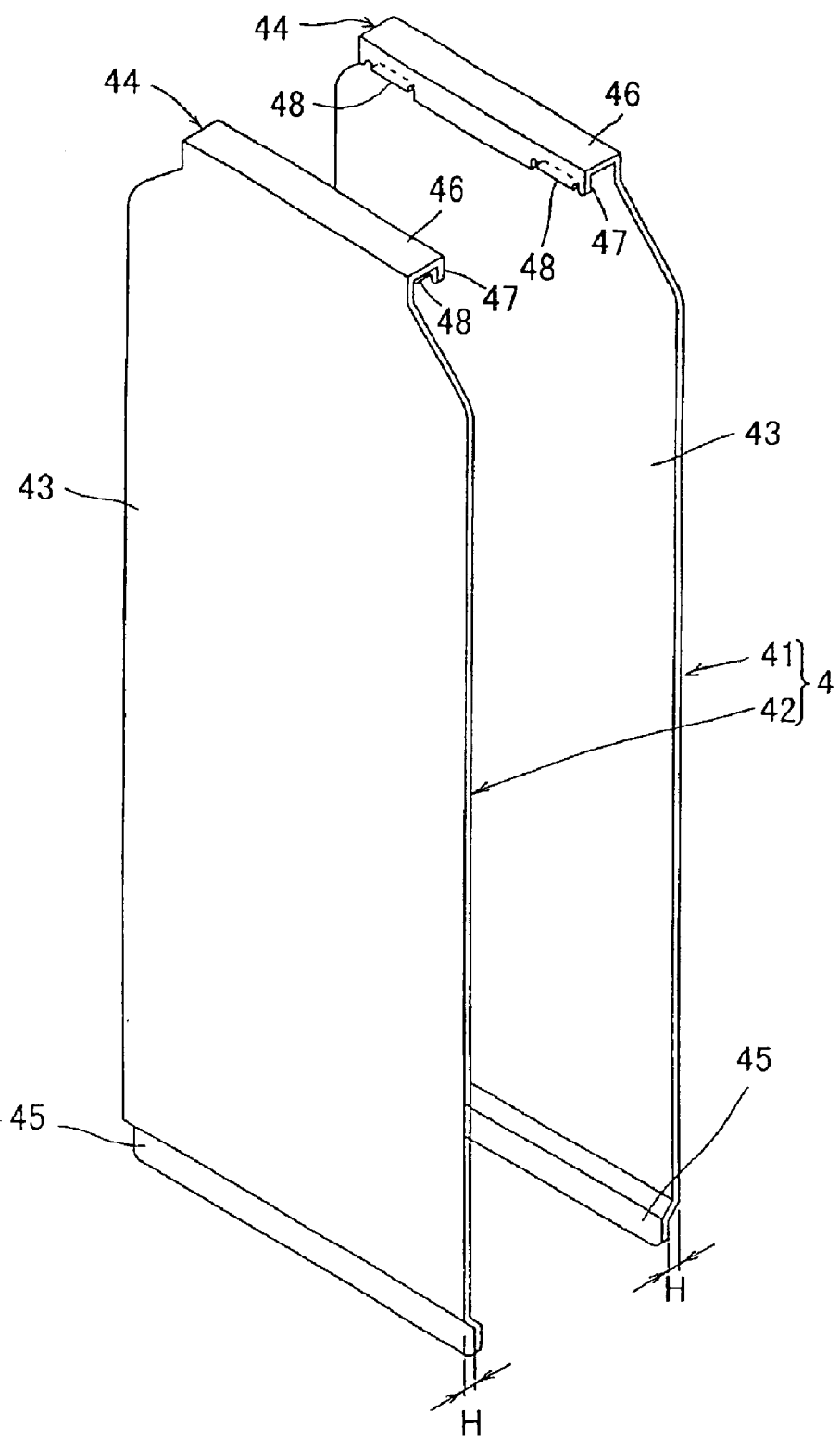
FIG. 10 is a perspective view of first and second shutter plates.

As shown in FIG. 10, the slide-member mounting portion 44 is provided with a first bend 46 continuously arranged at an end of the shutter main body 43 substantially at right angles and being narrower than the shutter main body 43, a second bend 47 continuously arranged at a front end of the first bend 43 substantially at right angles in the direction to overlap the shutter main body 43, and a third bend (refer hereafter to as "engaging claw") 48 continuously arranged at both end portions of a front end of the second bend 47 substantially at right angles toward the shutter main body 43. The constitution may be adopted wherein a screw hole 46a is arranged in the first bend 46, through which the first bend 46 is fixed to the slide member by the screw 46b.

The inserted-side end 45 is formed having a step H with respect to the shutter main body 43 for insertion into the shutter-end insertion 51 below the slide guide plate 52.

The first and second shutter plates 41, 42 are formed by bending a plate of metal such as stainless steel, aluminum or the like punched in a predetermined shape or out of synthetic resin and the like. In this embodiment, the same member is used for the first and second shutter plates 41, 42, but different members may be used intentionally, for example, by changing the shape of the inserted-side end 45.

5) Constitution of Slide Member

Figure 11:
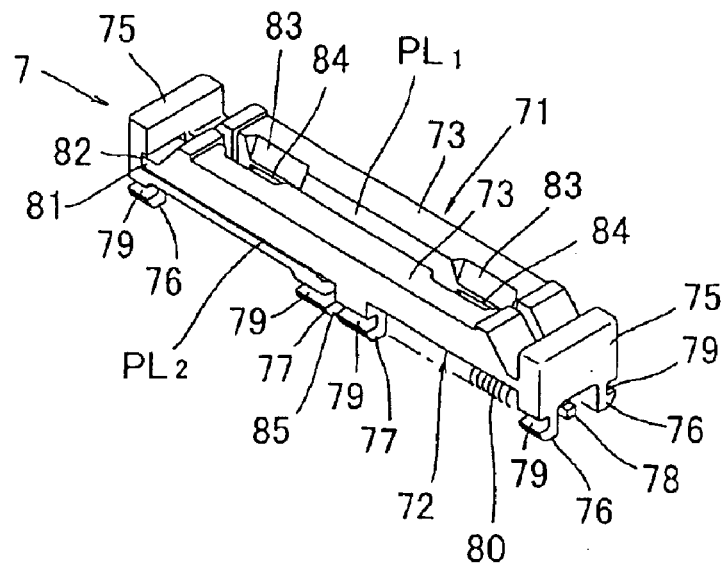
FIG. 11 is a perspective view of a slide member.
Figure 12:
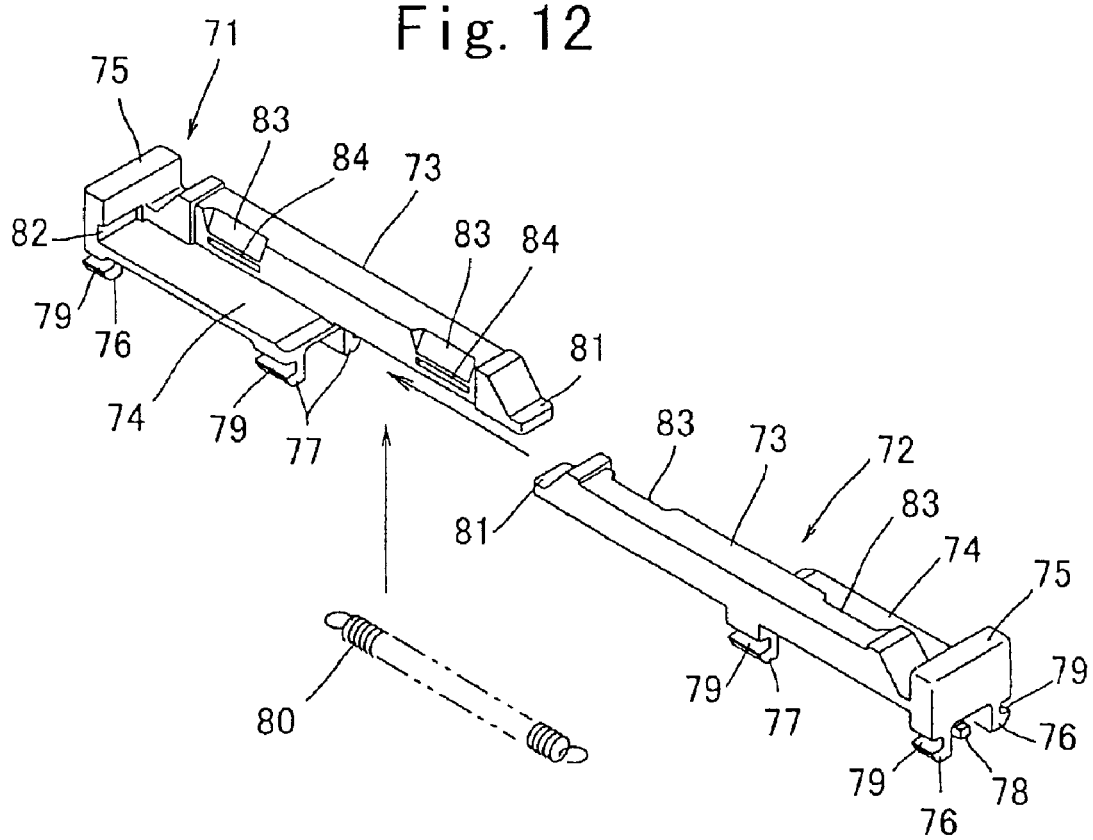
FIG. 12 is an exploded perspective view of the slide member.

As shown in FIGS. 11 and 12, by a parting line $PL_1$ in the slide direction (longitudinal direction), a parting line $PL_2$ in the thickness direction and the like, the slide member 7 is divided into a first slide portion 71 for slidably mounting the first shutter plate 41 to the shell 3 and a second slide portion 72 for slidably mounting the second shutter plate 42 to the shell 3.

The first and second slide portions 71, 72 are provided with a shutter-plate mounting portion 73 for mounting one of the first shutter plate 41 and the second shutter plate 42, a stage 74 formed at one side of the bottom of the shutter-plate mounting portion 73 and having roughly the same width as that of the shutter-plate mounting portion 73 and roughly half the length thereof and on which the shutter mounting potion of another slide member is disposed, a shutter-opening-member engagement 75 arranged on an upper face of the shutter-plate mounting portion 73 at an end in the slide direction and with which a shutter opening member (not shown) of the drive unit is engaged, a pair of first assembling legs 76 to the shell 3 arranged on a lower face of the shutter-plate mounting portion 73 at the end in the slide direction (the shutter-opening-member engagement 75), a pair of second assembling legs 77 arranged on a lower face of the shutter-plate mounting portion 73 in the center thereof, and a spring catch 78 arranged between the pair of first assembling legs 76 of the first and second slide portions 71, 72. The assembling legs 76, 77 has an outer surface provided with a groove-like concave 79 into which the guide projection 38 of the upper and lower halves 32, 33 is introduced.

The first and second slide portions 71, 72 are formed having the same shape and size and for disposing the shutter-plate mounting portion 73 of the first slide portion 71 on the stage 74 of the second slide portion 72 as well as disposing the shutter-plate mounting portion 73 of the second slide portion 72 on the stage 74 of the first slide portion 71. One and another ends of a spring member (coil spring) 80 are caught by a spring catch 78 provided to the first and second slide portions 71, 72, respectively.

The first and second slide portions 71, 72 are pulled to each other by the spring member 80 so that a front end of the shutter-plate mounting portion 73 of the first slide portion 71 abuts on the shutter-opening-member engagement 75 of the second slide portion 72, and a front end of the shutter-plate mounting portion 73 of the second slide portion 72 abuts on the shutter-opening-member engagement 75 of the first slide portion 71. Thus, the first and second slide portions 71, 72 are coupled to each other as shown in FIG. 11.

A convex 81 and a concave 82 fitted to each other are arranged at an abutment between the front end of the shutter-plate mounting portion 73 and the shutter-opening-member engagement 75. Fitting of these convex 81 and concave 82 prevents positional displacement (separation) of the first and second slide portions 71, 72 in the coupled state.

So-called chamfered inclined faces 83 are arranged at both ends of the inner surface of the first and second shutter-plate mounting portions 73, and a claw engagement 84 is arranged at the lower end of the inclined face 83. An accommodation space for the spring member 80 is defined between the first and second legs 76, 76, 77, 77.

Figure 13:
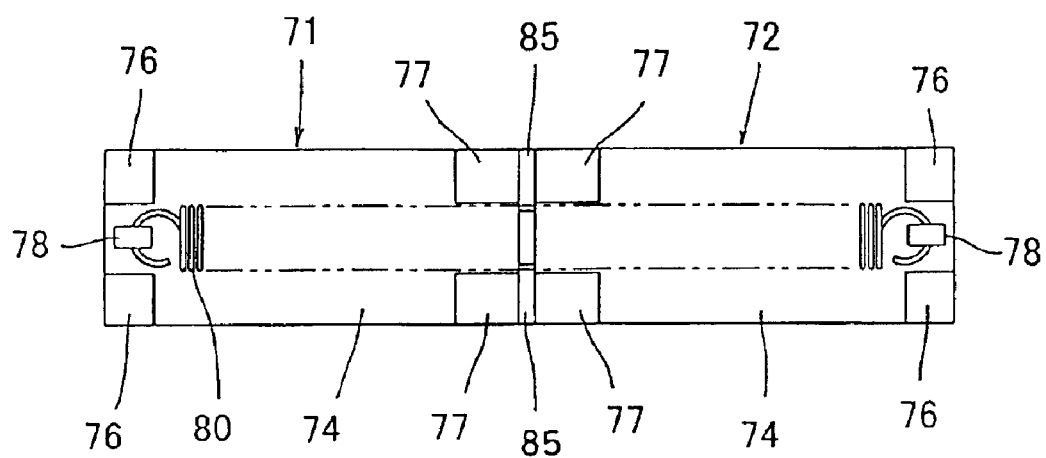
FIG. 13 is a bottom view of the slide member.

As shown in FIGS. 12 and 13, the spring catch 78 is formed inside the outer surface of the first assembling leg 76 to allow mounting of the spring member 80 in the state to be placed within the lower face of the first and second shutter-plate mounting portions 73.

As shown in FIG. 13, a clearance 85 is arranged between the second assembling legs 77, 77 in the center of the bottom of the first and second slide portions 71, 72 coupled by the spring member 80, into which the positioning projection 39 arranged in the center of the guide projection 38 of the upper and lower halves 32, 33 is inserted.

Figure 14:
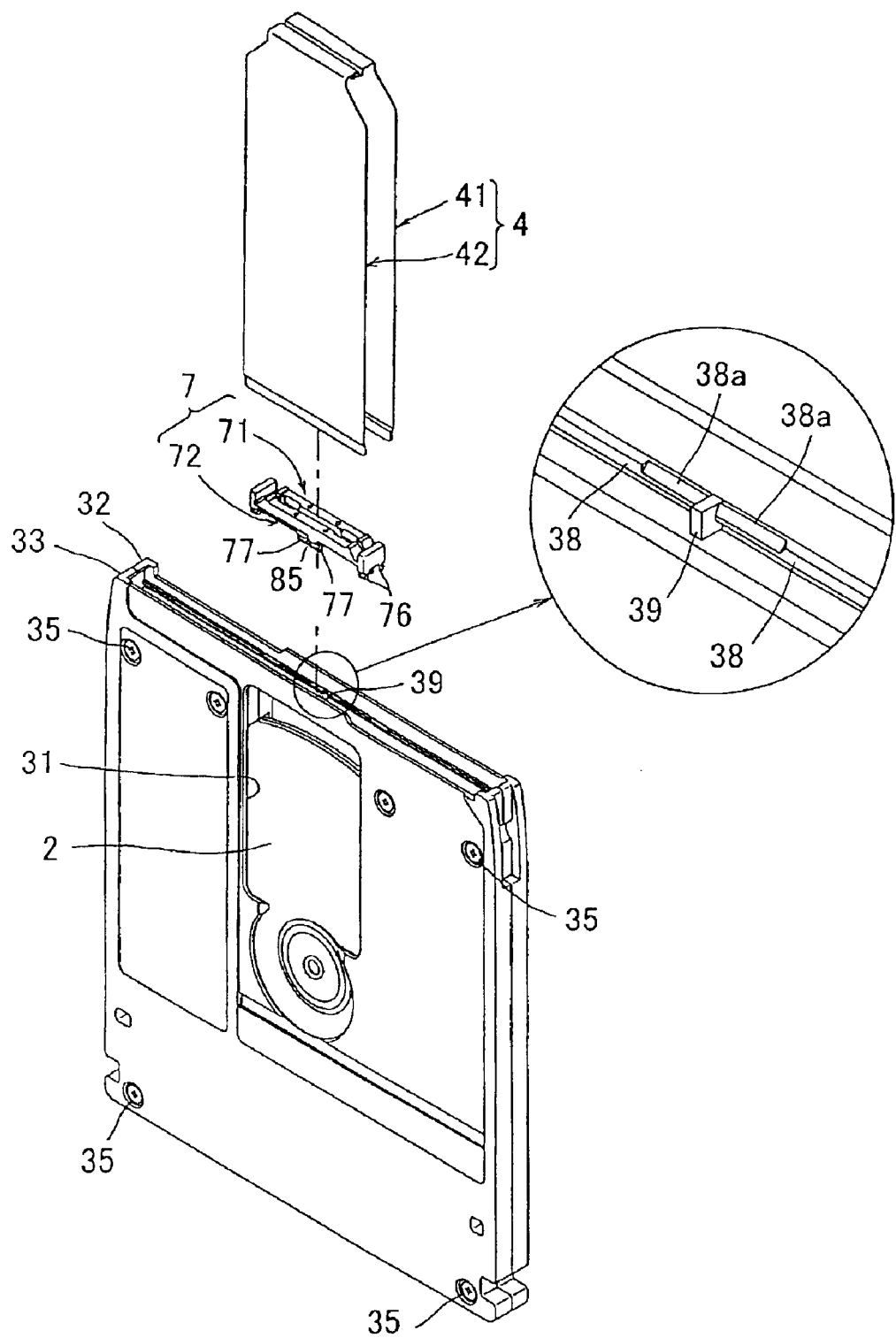
FIG. 14 is a perspective view of the shell in the assembled state.
Figure 15:
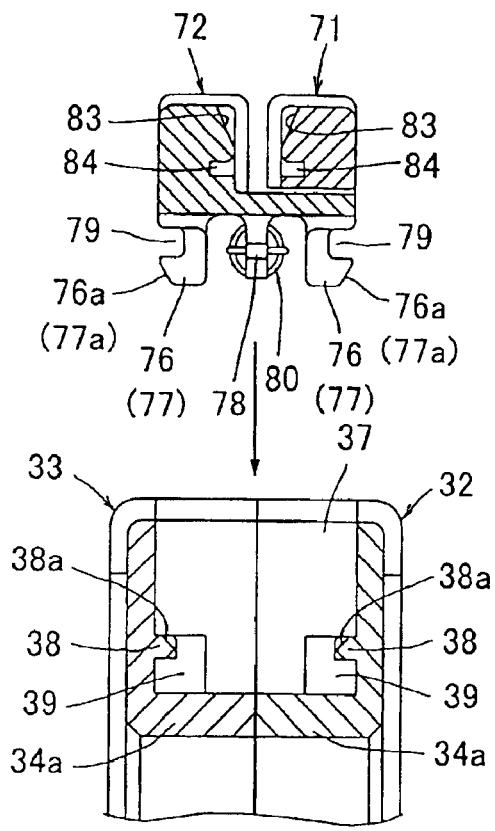
FIG. 15 is a process drawing of assembling of the slide member to the shell.
Figure 16:
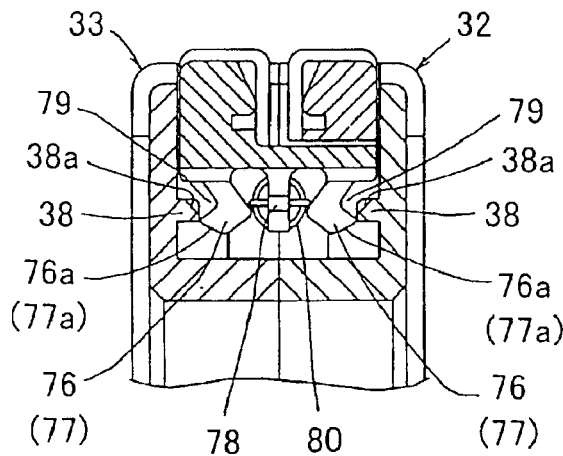
FIG. 16 is a process drawing of assembling of the slide member to the shell.

As shown in FIGS. 14 and 15, the first and second slide portions 71, 72 coupled by the spring member 80 are inserted from the side of the assembling legs 76, 77 into the slide-member assembling portion 37 between the upper and lower halves 32, 33 with the clearance 85 corresponding to the position of the shutter positioning projection 39. When the first and second slide portion 72, 72 are inserted, the inclined surfaces 76a, 77a of the assembling legs 76, 77 at the outer lower end thereon abut on the inclined surface 38a of the guide projection 38, so that the assembling legs 76, 77 are elastically deformed inward as shown in FIG. 16.

Figure 17:
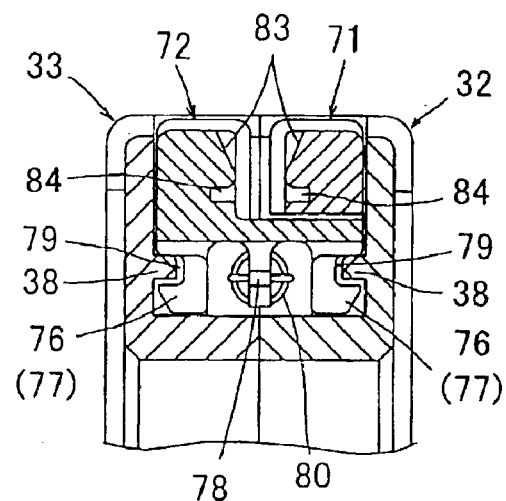
FIG. 17 is a process drawing of assembling of the slide member to the shell.
Figure 18:
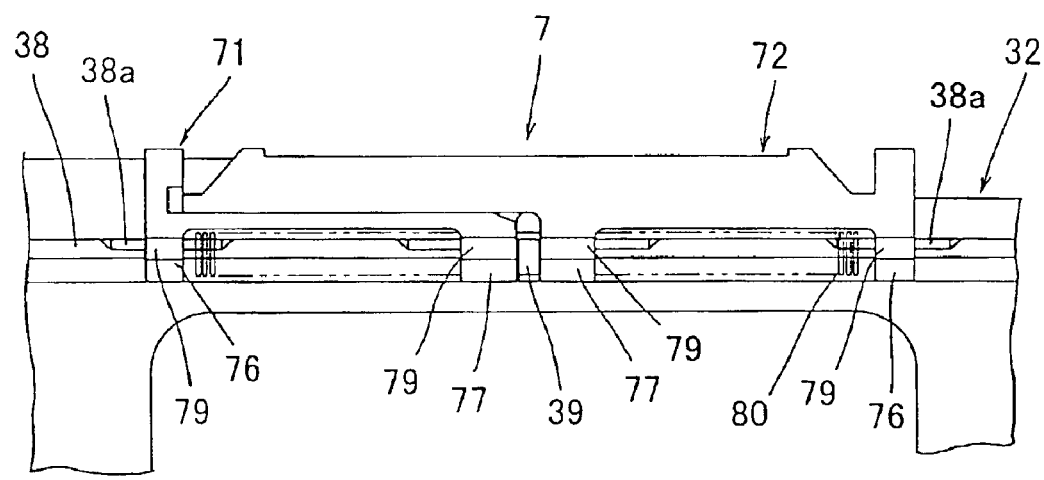
FIG. 18 is a side view of a principal part with the slide member assembled.

When the assembling legs 76, 77 pass the guide projection 38, the assembling legs 76, 77 return elastically as shown in FIG. 17, so that the guide projection 38 is introduced in the groove-like concave 79 arranged in the outer surface of the assembling legs 76, 77. And as shown in FIG. 18, the shutter positioning projection 39 arranged in the center of the guide projection 38 of the upper and lower halves 32, 33 enters the clearance 85 between the second assembling legs 77, 77 of the first and second slide portions 71, 72, so that the first and second slide portions 71, 72 are set to the first position for closing the openings 31 of the upper and lower halves 32, 33 by the first and second shutter plates 41, 42.

The first and second slide portions 71, 72 are formed out of synthetic resin having excellent lubricity, wear resistance and the like, such as polycarbonate, polyacetal, polypropylene or the like, for smooth sliding along the guide projection 38 arranged on the upper and lower halves 32, 33. The first and second slide portions 71, 72 have the same shape and size, and thus can be constructed as the same member or color-coded for assembling.

Next, the method of assembling the first and second shutter plates 41, 42 to the first and second slide portions 71, 72 is explained.

Figure 19:
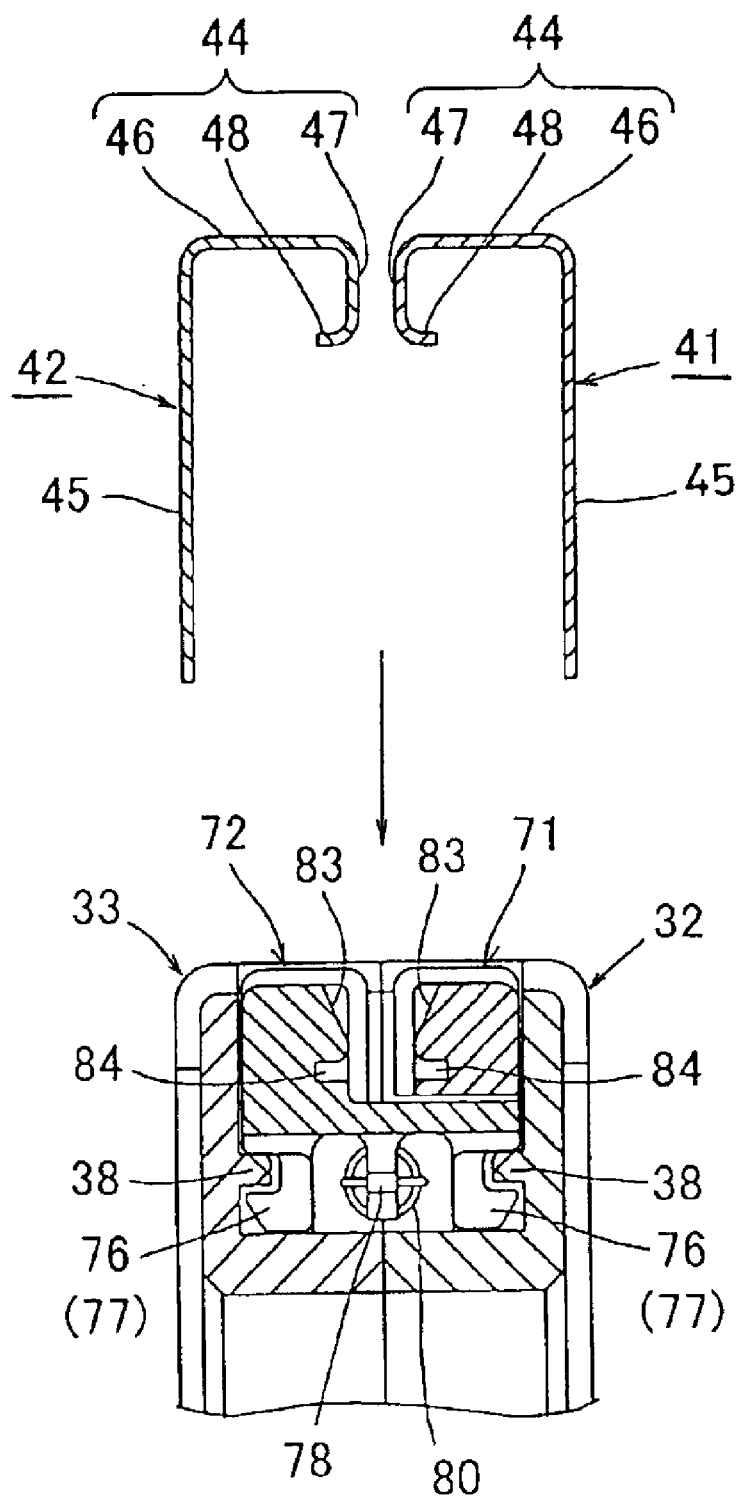
FIG. 19 is a process drawing of assembling of the shutter plate.

As shown in FIG. 19, the assembling of the first and second shutter plates 41, 42 to the first and second slide portions 71, 72 is carried out such that the first and second slide portions 71, 72 are assembled to the shell, then the slide-member mounting portion 44 is lowered from above to insert the shutter-plate mounting portion 73 of the first and second slide portions 71, 72 into the slide-member mounting portion 44.

Figure 20:
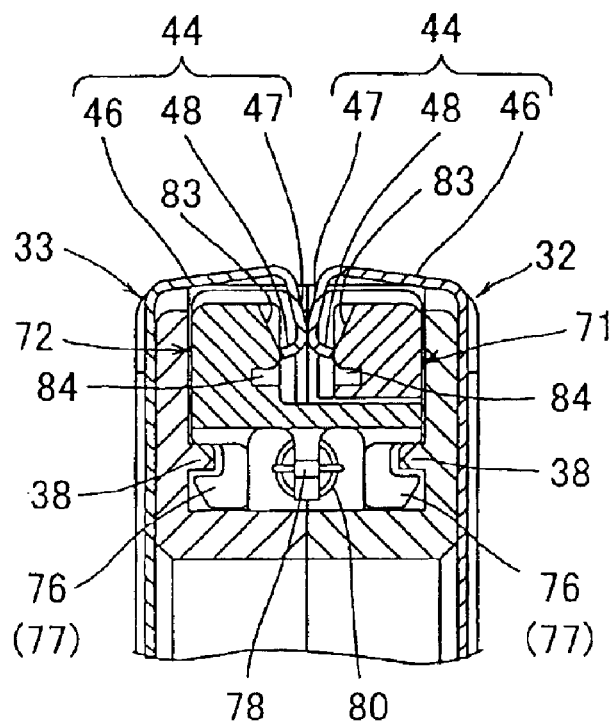
FIG. 20 is a process drawing of assembling of the shutter plate.

When inserting the second bend 47 and the engaging claw 48 of the slide-member mounting portion 44 of the first and second shutter plates 41, 42 between the first and second slide portions 71, 72, the engaging claw 48 of the slide-member mounting portion 44 abuts on the inclined surface 83 as shown in FIG. 20, so that the engaging claw 48 and the second bend 47 are elastically deformed in the direction to separate from the shutter main body 43 by the inclined surface 83, allowing further insertion of the first and second slide portions 71, 72.

When inserting the inner surface of the first bend 46 of the first and second shutter plates 41, 42 up to the position abutting on the front-end surface of the first and second slide portions 71, 72, the engaging claw 48 is out of the position of the inclined surface 83.

Figure 21:
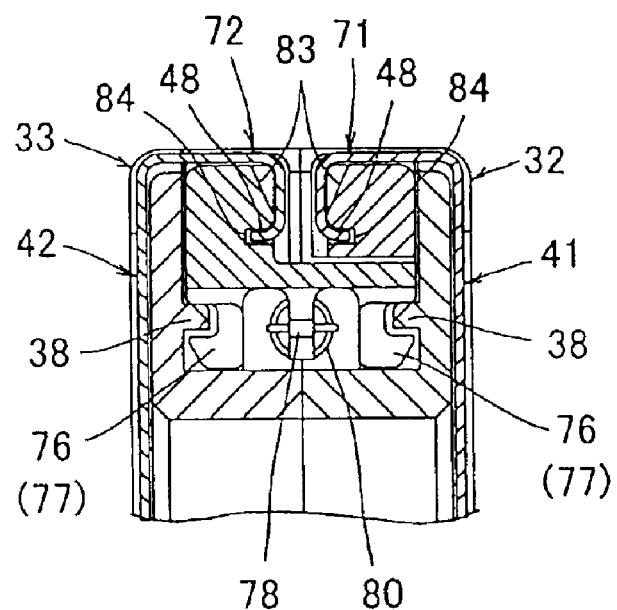
FIG. 21 is a process drawing of assembling of the shutter plate.

When the engaging claw 48 is out of the inclined face 83, the second bend 47 which was elastically deformed by being pressed by the inclined face 83 through the engaging claw 48 returns elastically to engage the engaging claw 48 with the claw engagement 84 as shown in FIG. 21, so that the first and second shutter plates 41, 42 become a state to be slidably mounted to the shell 3 through the first and second slide portions 71, 72.

6) Another Embodiment

A case is shown as another embodiment, wherein the strength of coupling of the first and second shutter plates 41, 42 to the first and second slide portions 71, 72 is enhanced without using the shutter mounting screw 46b as shown in FIG. 5.

Figure 22:
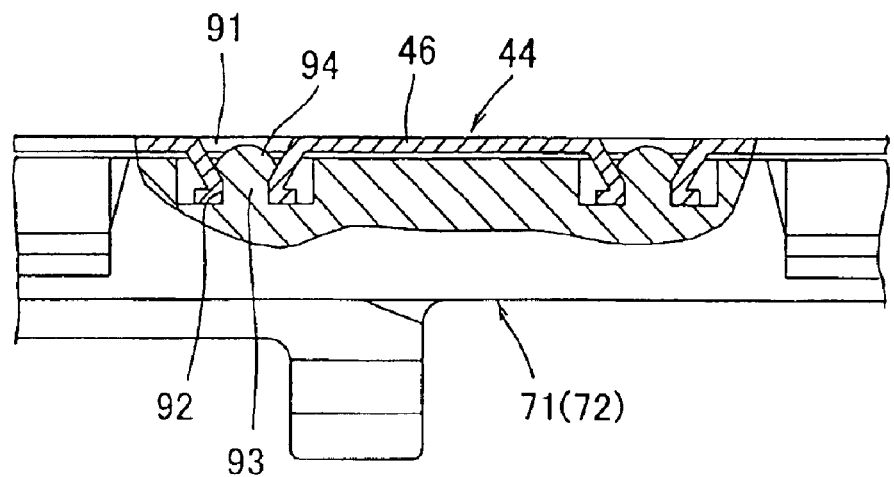
FIG. 22 is a sectional view of another embodiment.

In the embodiment shown in FIG. 22, the upper surface of the first bend 46 of the slide-member mounting portion 44 of the first and second shutter plates 41, 42 is partly dented to form a circular concave 91, and a hole 92 is formed in the bottom of the concave 91. On the other hand, a convex 93 having diameter slightly larger than that of the hole 92 is protrusively arranged on the upper surface of the shutter-plate mounting portion 73 of the first and second slide portions 71, 72, wherein when the first bend 46 is placed on the upper surface of the shutter-plate mounting portion 73, the convex 93 is press fitted into the concave 91 through the hole 92 for positioning of the first bend 46 and the shutter-plate mounting portion 73 and enhancement of the coupling strength of the two. A large-diameter portion 94 for preventing disengagement may be arranged at the upper end of the convex 93.

Figure 23:
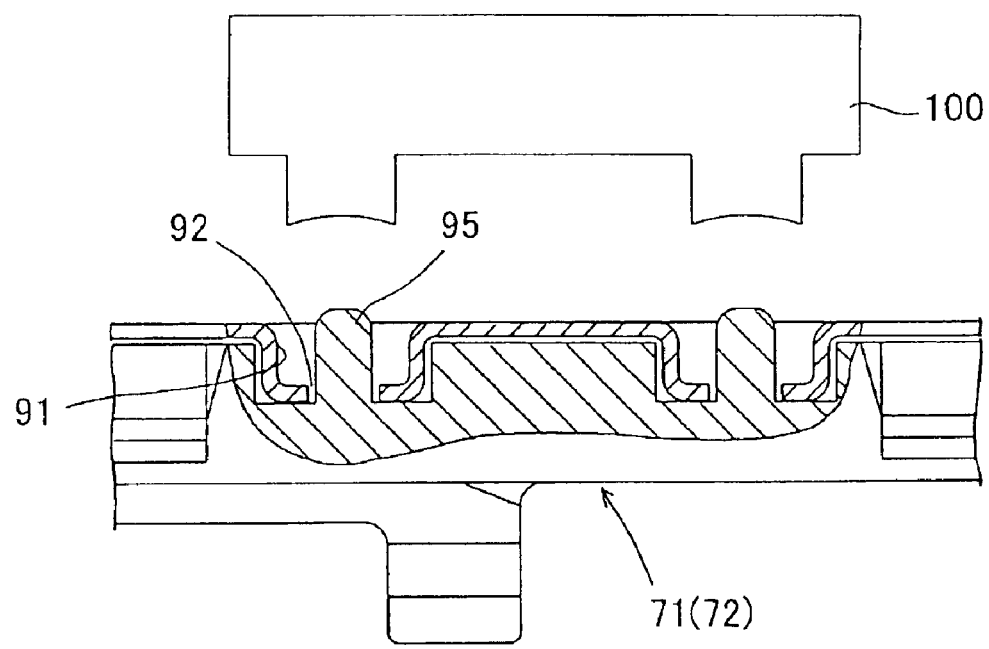
FIG. 23 is a sectional view of another embodiment.
Figure 24:
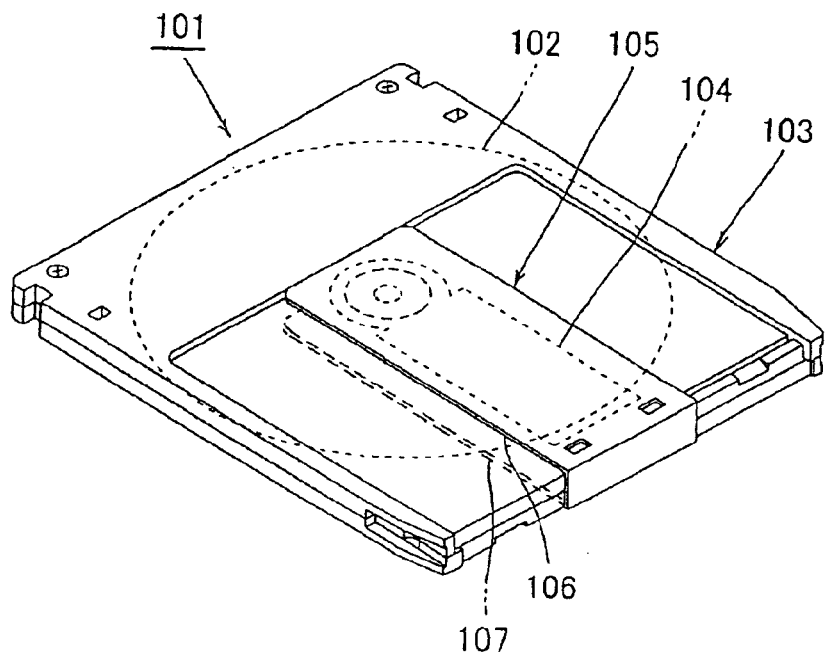
FIG. 24 is a perspective view of the cartridge using a conventional integrated shutter.
Figure 25:
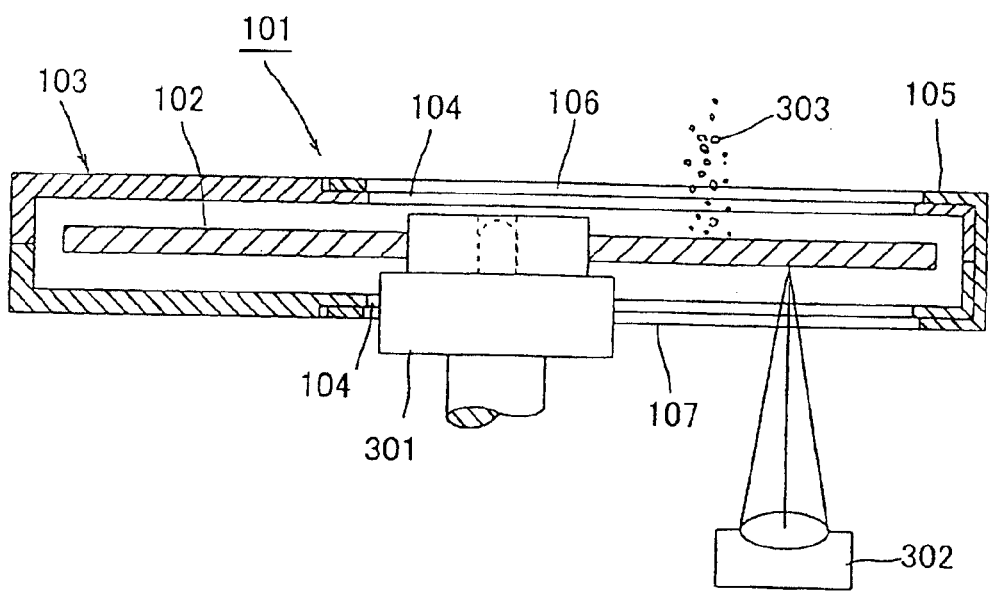
FIG. 25 is a sectional view of the cartridge loaded into the drive unit.
Figure 26:
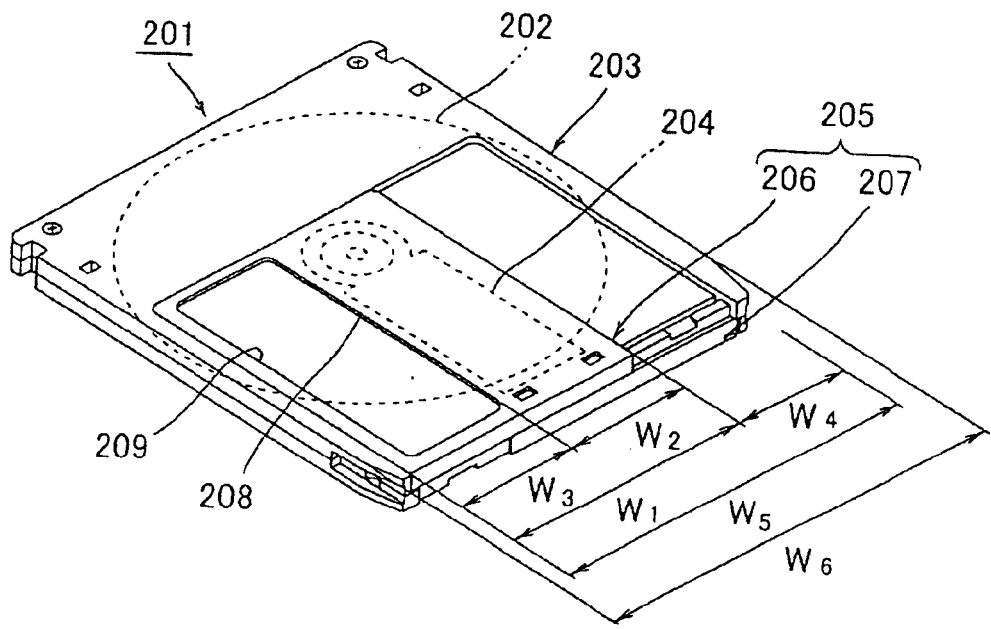
FIG. 26 is a perspective view of a conventional cartridge using a divided shutter.
Figure 27:
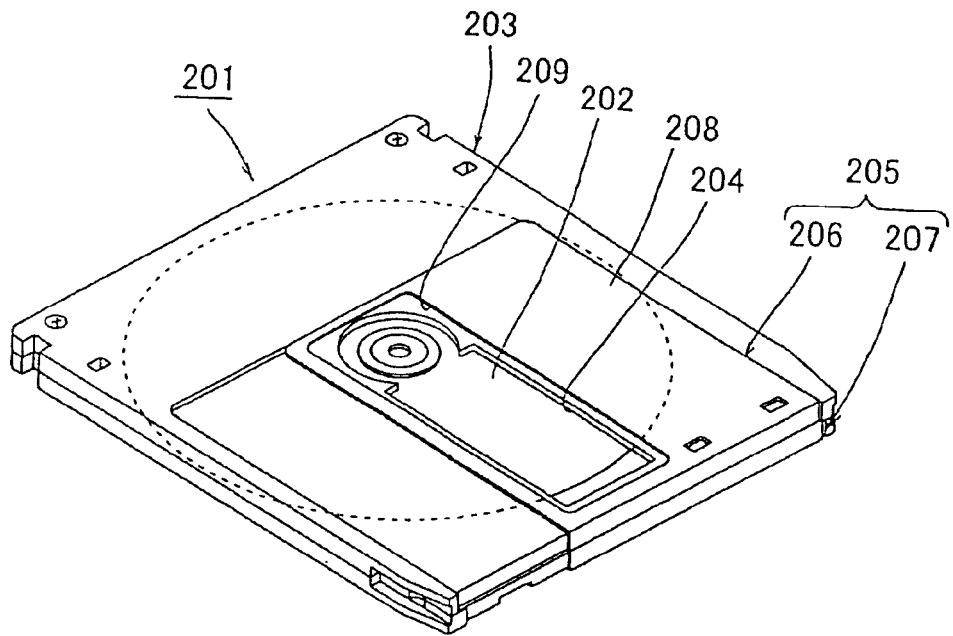
FIG. 27 is a perspective view of the conventional cartridge using a divided shutter, seen from the reverse side.
Figure 28:
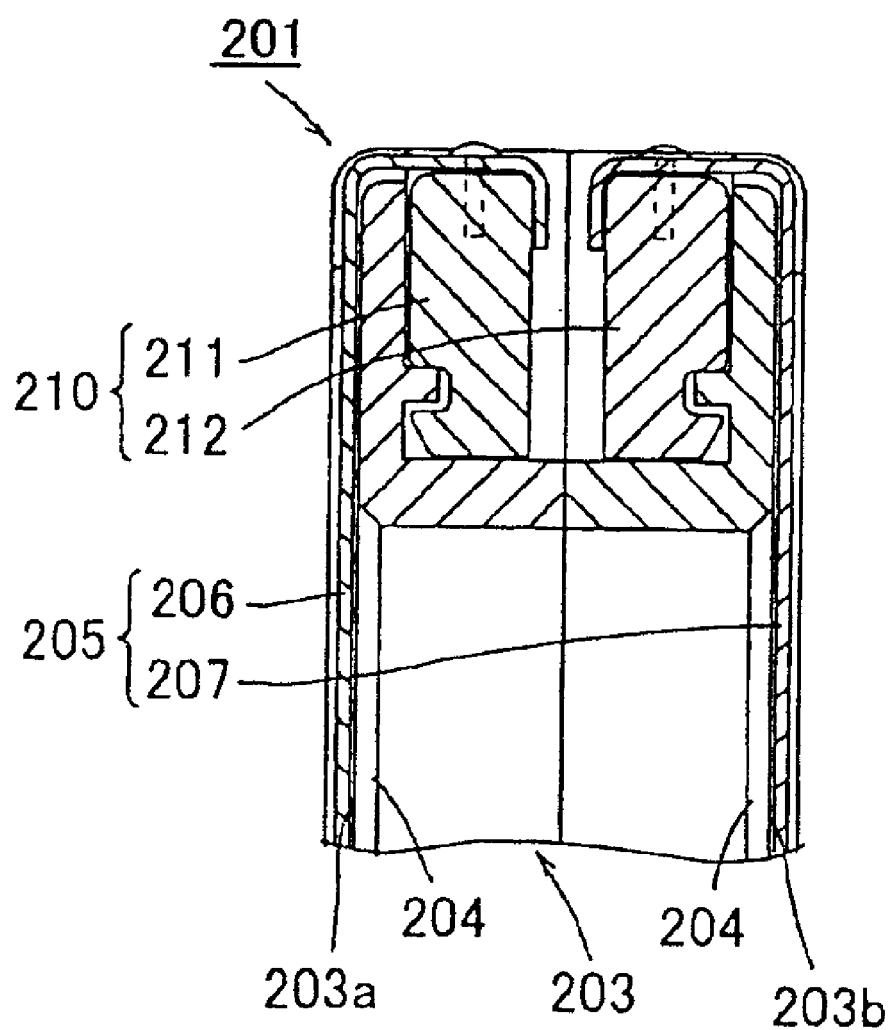
FIG. 28 is a sectional view of a principal part of the conventional cartridge using a divided shutter.
Figure 29:
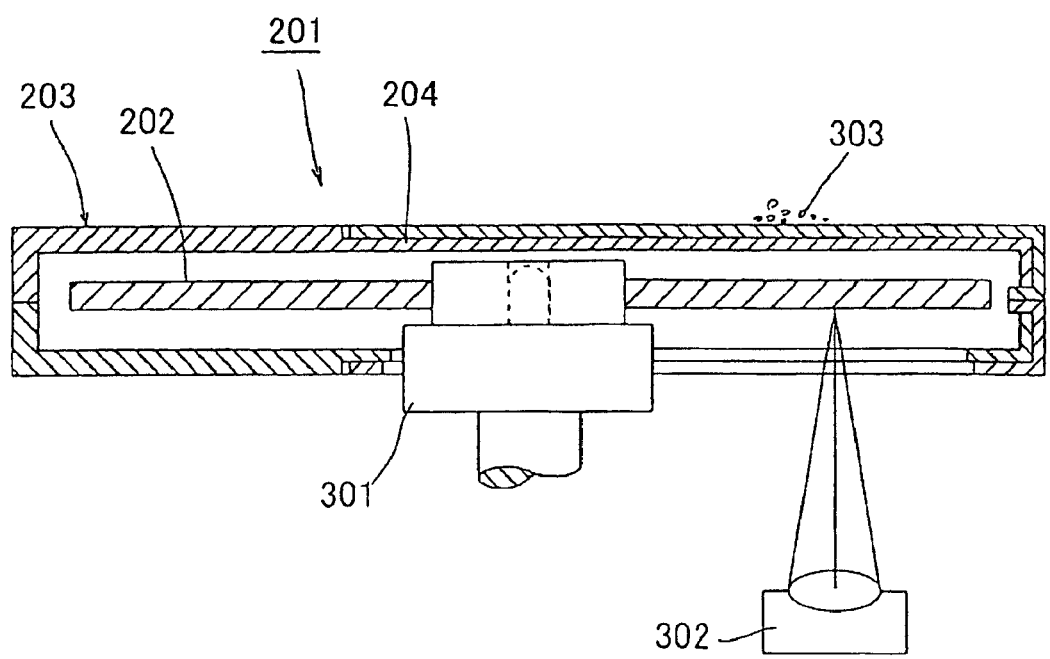
FIG. 29 is a sectional view of the cartridge loaded into the drive unit.
Figure 30:
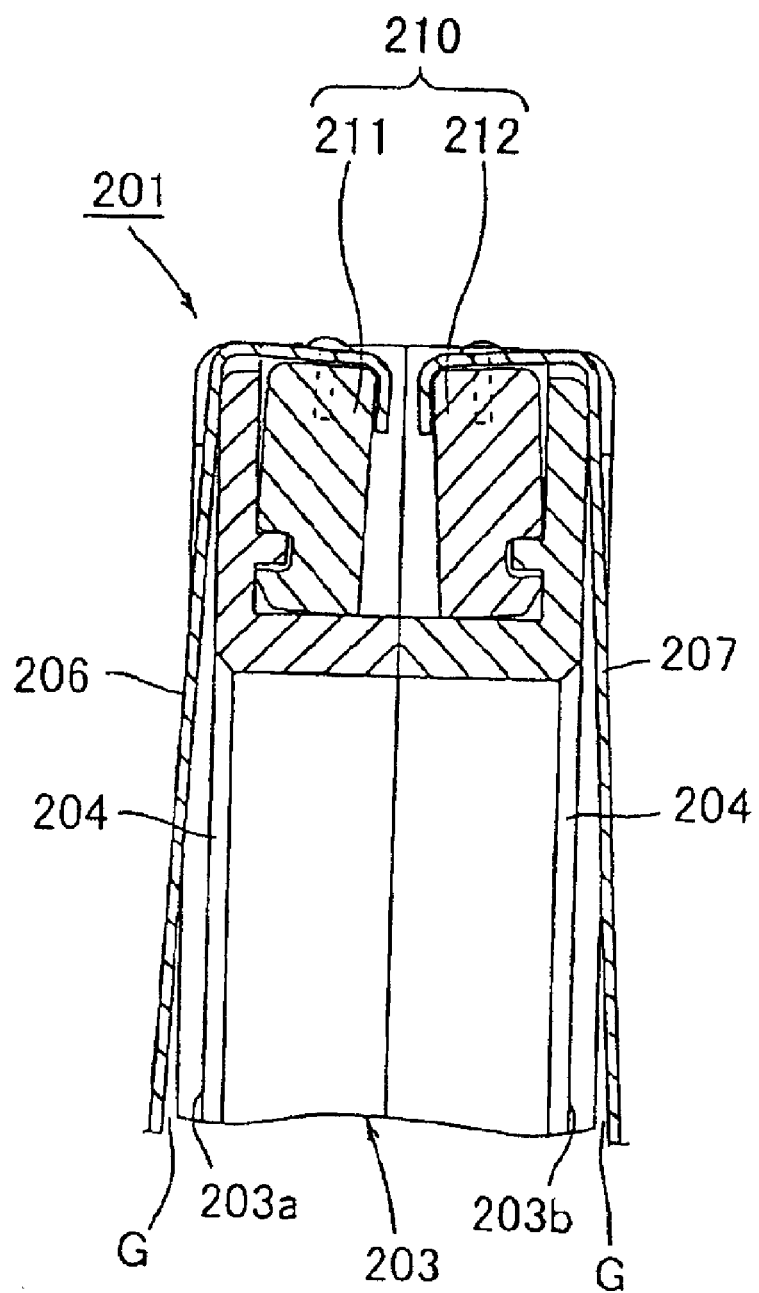
FIG. 30 is a sectional view showing the problems of the conventional examples.

In the embodiment shown in FIG. 23, in the same way as the embodiment shown in FIG. 22, the upper surface of the first bend 46 of the slide-member mounting portion 44 of the first and second shutter plates 41, 42 is dented to form a circular concave 91, and a hole 92 is formed in the bottom of the concave 91. On the other hand, a convex 95 having diameter smaller than that of the hole 92 is protrusively arranged on the upper surface of the shutter-plate mounting portion 73 of the first and second slide portions 71, 72. The first bend 46 is placed on the upper surface of the shutter-plate mounting portion 73 to protrude the convex 95 into the concave 91 through the hole 92. Then, a hone 100 of an ultrasonic welding device is pressed to a front end of the convex 95 for melting, and the head (not shown) having diameter larger than that of the hole 92 is caulked, thus positioning the first bend 46 and the shutter-plate mounting portion 73 and enhancing the coupling strength of the two.

7) Operation

When loading into the drive unit the cartridge 1 in the position with the upper half 32 up and the lower half 33 down (refer hereafter to as "normal position") as shown in FIG. 1, the shutter opening member provided to the drive unit is engaged with the shutter-opening-member engagement 75 of the second slide portion 72, so that the second slide portion 72 is slid in the direction of arrow B to slide the second shutter plate 42 mounted to the second slide portion 72 to the second position for opening the opening 31 of the lower half 33 as the reverse side is seen in FIG. 3. At this time, the second shutter plate 42 has one side guided y the groove-like concave 79 of the assembling legs 76, 77 and the guide projection 38 arranged on the upper and lower halves 32, 33, and another side guided by the stage 74 of the first slide member 71, sliding smoothly without inclination.

And through the opening 31 of the lower half 33, the center hub 22 of the disc 2 is chucked on the turntable 301 of the drive unit for rotation as shown in FIG. 6, and recording and/or reproducing of the recording layer 24 of the first record medium 26 of the disc 2 is carried out by the optical pickup 302.

When loading into the drive unit the cartridge 1 in the position with the lower half 33 up and the upper half 32 down (refer hereafter to as "reverse position") as shown in FIG. 2, the shutter opening member provided to the drive unit is engaged with the shutter-opening-member engagement 75 of the first slide portion 72, so that the first slide portion 71 has one side guided by the groove-like concave 79 of the assembling legs 76, 77 and the guide projection 38 arranged on the upper and lower halves 32, 33, and another side guided by the stage 74 of the second slide member 72, sliding in the direction of arrow B. And as the reverse side is seen in FIG. 4, the first shutter plate 41 mounted to the first slide portion 71 is moved to the second position for opening the opening 31 of the upper half 32. And through the opening 31 of the upper half 32, the center hub 42 of the disc 2 is chucked on the turntable 301 of the drive unit for rotation, and recording and/or reproducing of the recording layer 24 of the second recording medium 27 of the disc 2 is carried out by the optical pickup 302.

When carrying out recording and/or reproducing in the normal position as well as recording and/or reproducing in the reverse position, another (upper) opening 31 which is not directly involved in recording and/or reproducing is maintained in the closed state, preventing dust or the like from entering the shell 3 through another opening 31 and adhering on the surface of the disc 2.

Since the moving directions of the first and second shutter plates 41, 42 are the same when sliding the first shutter plate 41 as shown in FIG. 3 from the first position to the second position and when sliding the second slide plate 42 as shown in FIG. 4 from the first position to the second position, the shutter opening member for opening the first shutter plate 41 can also serve as the shutter opening member for opening the second shutter plate 42.

INDUSTRIAL APPLICABILITY

The present invention can widely be applied not only to optical disc cartridges, but also magnetic and magneto-optical disc cartridges such as CD, and the like.

What is claimed is:

1. An information recording medium cartridge provide with a disc-like information recording medium, a cartridge casing having the information recording medium accommodated therein, a shutter slidably mounted to the cartridge casing and for opening and closing recording and/or reproducing openings arranged in right and reverse sides of the cartridge casing, and a slide member for movably mounting the shutter to the cartridge casing in a direction to open and close the openings, wherein the shutter is provided with a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the first and second shutter plates are independently moved between a first position for closing the recording and/or reproducing openings arranged in the right and reverse sides of the cartridge casing and a second position for opening the recording and/or reproducing openings, the first and second shutter plates are of a size large enough to close the recording and/or reproducing openings arranged in the right and reverse sides of the cartridge casing and substantially the same width as that of the openings, and that in the first position for closing the recording and/or reproducing openings, the first and second shutter plates are formed to overlap one another in a vertical direction of the cartridge casing, the first and second slide portions are provided with a shutter-plate mounting portion formed by dividing the slide member in a moving direction and a stage protrusively formed at one side of the shutter-plate mounting portion by dividing the slide member in a thickness direction and having substantially half a length of the shutter-plate mounting portion in the moving direction, and part of the shutter-plate mounting portion of one of the first and second slide portions is supported in a state placed on the stage of another slide portion.

2. The information recording medium cartridge as specified in claim 1, characterized in that the stage is formed with a lower portion of the shutter-plate mounting portion at one side and having substantially the same width as that of the shutter-plate mounting portion.

3. The information recording medium cartridge as specified in claim 1, characterized in that the first and second slide portions are formed having the same shape and size.

4. An information recording medium cartridge provided with a disc-like information recording medium, a cartridge casing having the information recording medium accommodated therein, a shutter slidably mounted to the cartridge casing and for opening and closing recording and/or reproducing openings arranged in right and reverse sides of the cartridge casing, and a slide member for movably mounting the shutter to the cartridge casing in a direction to open and close the openings, wherein the shutter is provided with a first shutter plate for opening and closing the recording and/or reproducing opening arranged in one of the right and reverse sides of the cartridge casing and a second shutter plate for opening and closing the recording and/or reproducing opening arranged in another side of the cartridge casing, wherein the first and second shutter plates are independently moved between a first position for closing the recording and/or reproducing openings arranged in the right and reverse sides of the cartridge casing and a second position for opening the recording and/or reproducing openings, the first and second shutter plates are of a size large enough to close the recording and/or reproducing openings arranged in the right and reverse sides of the cartridge casing and substantially the same width as that of the openings, and that in the first position for closing the recording and/or reproducing openings, the first and second shutter plates are formed to overlap one another in a vertical direction of the cartridge casing, the slide member is divided into a first slide portion to which the first shutter plate is mounted and a second slide portion to which the second shutter plate is mounted, and the first and second slide portions comprise a shutter-plate mounting portion to which any one of the first and second shutter plates is mounted, a stage formed with a bottom of the shutter-plate mounting portion at one side and having substantially the same width as that of the shutter-plate mounting portion and substantially half a length thereof and on which the shutter mounting portion of another slide member is disposed, a shutter-opening-member engagement arranged on an upper face of the shutter-plate mounting portion at an end in a slide direction and with which a shutter opening member of a drive unit is engaged, a pair of assembling legs to the cartridge casing and arranged on a lower face of the shutter-plate mounting portion in a center portion, and a pair of assembling legs to a shell and arranged on a lower face of the shutter-opening-member engagement.

5. The information recording medium cartridge as specified in claim 4, characterized in that the first and second slide portions are provided with a spring catch to which one and another ends of a spring member are caught, and that a front end of the shutter-plate mounting portion of one of the first and second slide portions is engaged with the shutter-opening-member engagement of another slide portion.

6. The information recording medium cartridge as specified in claim 5, characterized in that the spring catch is arranged between and inside the pair of assembling legs.

7. The information recording medium cartridge as specified in claim 4, characterized in that positioning concave and convex fitted to each other are provided to a contact face of the front end of the shutter-plate mounting portion and the shutter-opening-member engagement.

8. The information recording medium cartridge as specified in claim 4, characterized in that the first and second slide portions are formed having the same shape and size.

9. The information recording medium cartridge as specified in claim 4, characterized in that the cartridge casing has at one side of the openings a shutter slide area and at another side thereof a label adhesion area.

10. The information recording medium cartridge as specified in claim 4, characterized in that the second positions of the cartridge casing on the right and reverse sides are arranged in a position symmetrical about the first position to allow reverse loading to a recording and reproducing device.

* * * * *